(12) United States Patent
Spurlock et al.

(10) Patent No.: US 7,567,235 B2
(45) Date of Patent: Jul. 28, 2009

(54) SELF-ALIGNING OPTICAL SENSOR PACKAGE

(75) Inventors: Brett A. Spurlock, Los Altos, CA (US); Steven Sanders, Belmont, CA (US); Clinton B. Carlisle, Palo Alto, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 381 days.

(21) Appl. No.: 11/301,833

(22) Filed: Dec. 12, 2005

(65) Prior Publication Data

US 2007/0131946 A1 Jun. 14, 2007

(51) Int. Cl.
G06F 3/033 (2006.01)
H01L 23/04 (2006.01)
H01L 21/00 (2006.01)

(52) U.S. Cl. .................. 345/166; 257/680; 438/116
(58) Field of Classification Search .......... 345/166; 257/680; 438/116
See application file for complete search history.

(56) References Cited

U.S. PATENT DOCUMENTS

| | | | |
|---|---|---|---|
| 3,922,093 A | 11/1975 | Dandliker et al. | |
| 4,546,347 A | 10/1985 | Kirsch | |
| 4,799,055 A | 1/1989 | Nestler et al. | |
| 5,288,993 A | 2/1994 | Bidiville et al. | |
| 5,345,257 A | 9/1994 | Lebby et al. | |
| 5,355,018 A * | 10/1994 | Fierkens ............ 257/669 | |
| 5,473,344 A | 12/1995 | Bacon et al. | |
| 5,578,813 A | 11/1996 | Allen et al. | |
| 5,606,174 A | 2/1997 | Yoshimura et al. | |
| 5,644,139 A | 7/1997 | Allen et al. | |
| D382,550 S | 8/1997 | Kaneko et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Dandliker et al. | |
| 5,781,229 A | 7/1998 | Zediker et al. | |
| 5,786,804 A | 7/1998 | Gordon | |
| 5,825,044 A | 10/1998 | Allen et al. | |
| 5,854,482 A | 12/1998 | Bidiville et al. | |
| 5,861,654 A * | 1/1999 | Johnson ................ 257/433 | |
| 5,907,152 A | 5/1999 | Dandliker et al. | |
| 5,963,197 A | 10/1999 | Bacon et al. | |
| 5,994,710 A | 11/1999 | Knee et al. | |
| 6,031,218 A | 2/2000 | Piot et al. | |

(Continued)

OTHER PUBLICATIONS

International Search Report of International Searching Authority, dated Jul. 3, 2008 for International Application No. PCT/US2006/046985; 2 pages.

(Continued)

*Primary Examiner*—Evan Pert

(57) ABSTRACT

One embodiment relates to an optical navigation device. The device includes a lead frame having reference features, a laser, a detector array, and an optical component having alignment features. The laser is attached to the lead frame and positioned in reference to the reference features of the lead frame. The detector array is attached to the lead frame and positioned in reference to the reference features of the lead frame. The optical component is coupled to the lead frame so that its alignment features register to the reference features of the lead frame. In this way, the molded optical component is passively aligned to the laser and the detector array. Other embodiments are also disclosed.

18 Claims, 4 Drawing Sheets

U.S. PATENT DOCUMENTS

| | | | |
|---|---|---|---|
| 6,037,643 A | 3/2000 | Knee | |
| 6,057,540 A | 5/2000 | Gordon et al. | |
| 6,097,371 A | 8/2000 | Siddiqui et al. | |
| 6,151,015 A | 11/2000 | Badyal et al. | |
| 6,172,354 B1 | 1/2001 | Adan et al. | |
| 6,225,617 B1 | 5/2001 | Dandliker et al. | |
| 6,233,368 B1 | 5/2001 | Badyal et al. | |
| 6,281,881 B1 | 8/2001 | Siddiqui et al. | |
| 6,281,882 B1 | 8/2001 | Gordon et al. | |
| 6,326,950 B1 | 12/2001 | Liu | |
| 6,330,057 B1 | 12/2001 | Lederer et al. | |
| 6,351,257 B1 | 2/2002 | Liu | |
| 6,396,479 B2 | 5/2002 | Gordon | |
| 6,421,045 B1 | 7/2002 | Venkat et al. | |
| 6,424,407 B1 | 7/2002 | Kinrot et al. | |
| 6,433,780 B1 | 8/2002 | Gordon et al. | |
| 6,452,683 B1 | 9/2002 | Kinrot et al. | |
| 6,455,840 B1 | 9/2002 | Oliver et al. | |
| D464,352 S | 10/2002 | Kerestegian | |
| 6,462,330 B1 | 10/2002 | Venkat et al. | |
| 6,476,970 B1 | 11/2002 | Smith | |
| 6,529,184 B1 | 3/2003 | Julienne | |
| 6,585,158 B2 | 7/2003 | Norskog | |
| 6,603,111 B2 | 8/2003 | Dietz et al. | |
| 6,621,483 B2 | 9/2003 | Wallace et al. | |
| 6,642,506 B1 | 11/2003 | Nahum et al. | |
| 6,653,724 B1 * | 11/2003 | Kim et al. | 257/684 |
| 6,657,184 B2 | 12/2003 | Anderson et al. | |
| 6,664,948 B2 | 12/2003 | Crane et al. | |
| 6,674,475 B1 | 1/2004 | Anderson | |
| 6,677,929 B2 | 1/2004 | Gordon et al. | |
| 6,703,599 B1 | 3/2004 | Casebolt et al. | |
| 6,737,636 B2 | 5/2004 | Dietz et al. | |
| 6,774,351 B2 | 8/2004 | Black | |
| 6,774,915 B2 | 8/2004 | Rensberger | |
| 6,795,056 B2 | 9/2004 | Norskog et al. | |
| 6,809,723 B2 | 10/2004 | Davis | |
| 6,819,314 B2 | 11/2004 | Black | |
| 6,823,077 B2 | 11/2004 | Dietz et al. | |
| 2001/0052640 A1 * | 12/2001 | Sekimoto | 257/678 |
| 2002/0130835 A1 | 9/2002 | Brosnan | |
| 2002/0158300 A1 | 10/2002 | Gee | |
| 2002/0190953 A1 | 12/2002 | Gordon et al. | |
| 2003/0034959 A1 | 2/2003 | Davis et al. | |
| 2003/0058506 A1 | 3/2003 | Green et al. | |
| 2003/0142288 A1 | 7/2003 | Kinrot et al. | |
| 2003/0161591 A1 * | 8/2003 | Chiang et al. | 385/89 |
| 2004/0084610 A1 | 5/2004 | Leong et al. | |
| 2004/0189593 A1 | 9/2004 | Koay | |
| 2005/0024336 A1 | 2/2005 | Xie et al. | |
| 2005/0024623 A1 | 2/2005 | Xie et al. | |
| 2005/0083303 A1 | 4/2005 | Schroeder et al. | |
| 2006/0067630 A1 * | 3/2006 | Kim | 385/88 |
| 2006/0153507 A1 * | 7/2006 | Togami et al. | 385/93 |

OTHER PUBLICATIONS

International Preliminary Report on Patentability, dated Jul. 22, 2008 for International Application No. PCT/US2006/046985; 6 pages.
International Written Opinion of International Searching Authority, dated Jul. 3, 2008 for International Application No. PCT/US2006/046985; 5 pages.

* cited by examiner

SELF-ALIGNING OPTICAL SENSOR PACKAGE

TECHNICAL FIELD

The present invention relates generally to apparatus and methods of packaging optical navigation sensors.

BACKGROUND OF THE INVENTION

Pointing devices, such as computer mice or trackballs, are utilized for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, and such. In addition, the movement and resultant wear of the mechanical elements, particularly the shaft encoders, necessarily limit the useful life of the device.

One solution to the above-discussed with mechanical mice problems has been the development of optical mice. Optical mice have become very popular because they are more robust and may provide a better pointing accuracy.

One approach used for optical mice relies on a light emitting diode (LED) illuminating a surface at or near grazing incidence, a two-dimensional CMOS (complementary metal-oxide-semiconductor) detector which captures the resultant images, and software that correlates successive images to determine the direction, distance and speed the mouse has been moved. This technology typically provides high accuracy but suffers from a complex design and relatively high image processing requirements. In addition, the optical efficiency is low due to the grazing incidence of the illumination.

Another approach differs from the standard technology in that it uses a coherent light source, such as a laser. Light from a coherent source scattered off of a rough surface generates a random intensity distribution of light known as speckle.

Devices using a coherent light source typically require alignment within specific tolerances in order to operate properly. Such alignment may pose problems and difficulties during the manufacture of the devices.

The present application discloses a novel design for packaging of an optical navigation sensor using a coherent light source. The disclosed design advantageously provides for passive self-alignment during the manufacture of the optical navigation sensor.

SUMMARY

One embodiment relates to an optical navigation device. The device includes a lead frame having reference features, a laser, a detector array, and an optical component having alignment features. The laser is attached to the lead frame and positioned in reference to the reference features of the lead frame. The detector array is attached to the lead frame and positioned in reference to the reference features of the lead frame. The optical component is coupled to the lead frame so that its alignment features register to the reference features of the lead frame. In this way, the molded optical component is passively aligned to the laser and the detector array.

An apparatus to passively align an external lens to one or more packaged die. The apparatus includes a lead frame having a reference feature. A die is mounted to the lead frame at a position precisely referenced to the reference feature of the lead frame. An alignment feature of the external lens registers to the reference feature of the lead frame.

Another embodiment relates to an apparatus to passively align an external lens to one or more packaged die. The apparatus includes a lead frame and the external lens. The lead frame has a reference feature and a die mounted therein at a position precisely referenced to the reference feature of the lead frame. An alignment feature of the external lens registers the external lens to the reference feature of the lead frame.

A method of passively aligning an external lens to a light source and a detector array. A lead frame is provided, and reference features are etched in the lead frame. The light source and the detector array are attached to the lead frame at positions referenced to the reference features of the lead frame. A molded optical component is provided including the external lens and having alignment features. The molded optical component is mechanically coupled to the lead frame such that the alignment features of the molded optical component register with the reference features of the lead frame.

Other embodiments are also disclosed.

BRIEF DESCRIPTION OF THE DRAWINGS

These and various other features and advantages of the present disclosure are understood more fully from the detailed description that follows and from the accompanying drawings, which, however, should not be taken to limit the appended claims to the specific embodiments shown, but are for explanation and understanding only.

DETAILED DESCRIPTION

Figure 1:
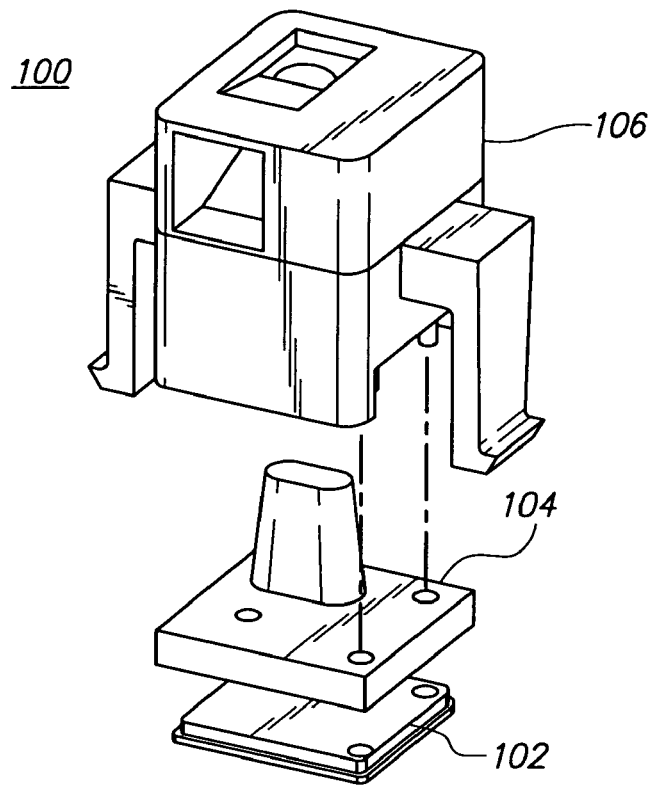
FIG. 1 is a perspective diagram of an optical sensor package including a lead frame package, aperture part, and molded lens in accordance with an embodiment of the invention.

FIG. 1 is a perspective diagram of an optical sensor package 100 in accordance with an embodiment of the invention. The package 100 may include a lead frame 102. As discussed further below in relation to FIG. 4A, the lead frame 102 may be configured to include a coherent light source 402, such as a vertical cavity surface emitting laser (VCSEL) die, and a detector 404, such as a photodiode array (PDA) die. The optical sensor package 100 may be advantageously utilized to provide self-alignment of the optics to the light source 402 and detector 404 for a laser-based optical navigation sensor.

As depicted, a molded lens 106 is configured to cover the lead frame 102. The molded lens 106 may comprise a clear (transparent) transfer molded package. In an alternative embodiment, the molded lens 106 may comprise an open cavity package.

An aperture part 104 may be configured so as to be placed between the molded lens 106 and the lead frame 102. The aperture part 104 may be configured to cover all or part of the lead frame 102. The aperture part 104 may be utilized to control the size of speckle features imaged at the detector 404 and may be configured so that the illumination of the surface is telecentric (i.e. normal to the surface).

Figure 2:
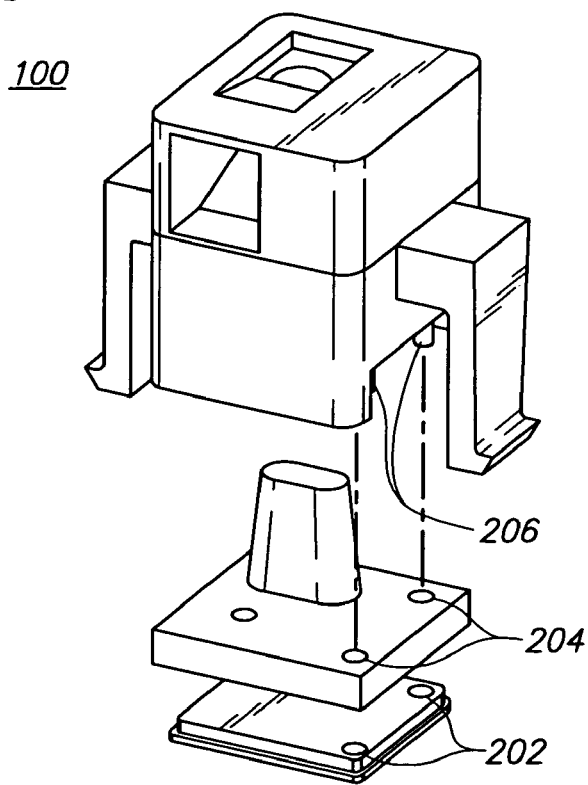
FIG. 2 is a perspective diagram of the optical sensor package showing alignment and reference features in accordance with an embodiment of the invention.

FIG. 2 is a perspective diagram of the optical sensor package 100 showing alignment features 206 and reference features 202 and 204 in accordance with an embodiment of the invention. These features enable precision self-alignment of the external molded lens 106 by registration of components to the package lead frame 102. This enables an optical navigation sensor comprising a light emitter 402 and a detector 404 in a single package lead frame 102 that is coupled to an external, passively aligned lens 106. Precision registration is required between the emitter die 402, the detector die 404, and the surfaces of the molded lens 106 in order to achieve high performance optical tracking by the optical navigation sensor.

The lead frame 102 includes reference features 202 in the form of precision registration holes to register the alignment features 206 of the molded optic piece 106. In one embodiment, the registration holes may be formed with precision by an etching process. The alignment features 206 of the molded optic piece 106 may be posts which are configured to fit into the registration holes. The precision registration holes of the lead frame 102 may be etched to enable a lens 106 to lead frame 102 positional tolerance of better (less) than +/−25 microns.

The aperture piece 104 may also include reference features 204 in the form of registration holes to register the alignment features 206 of the molded optic piece 106. Alternatively or in addition, the aperture piece 104 may register to the lead frame 102.

Figure 3:
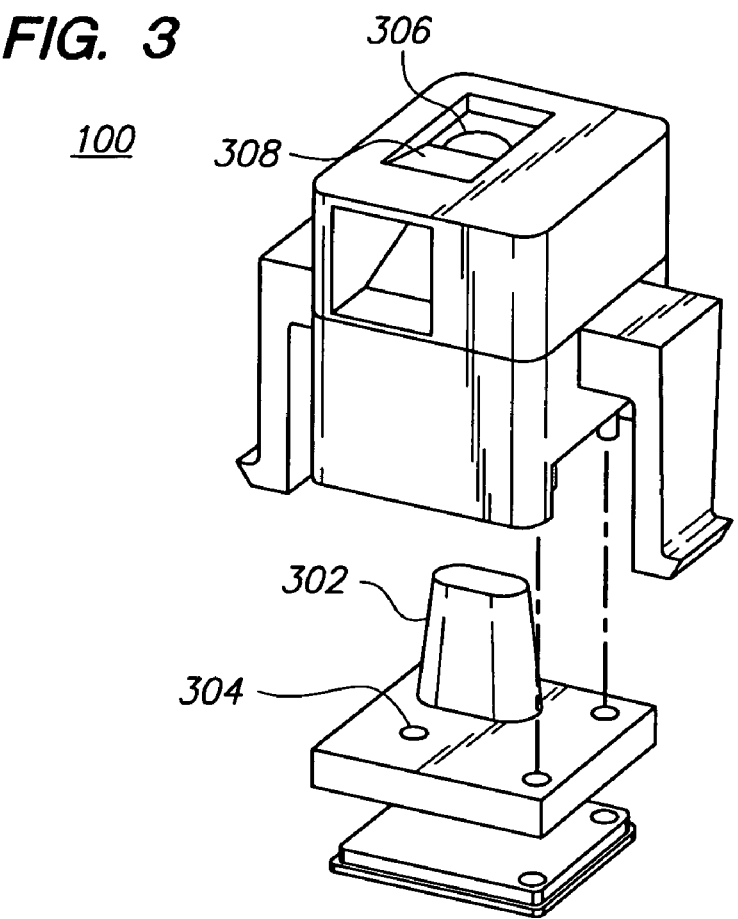
FIG. 3 is a perspective diagram of the optical sensor package showing various optical features in accordance with an embodiment of the invention.

FIG. 3 is a perspective diagram of the optical sensor package showing various optical features in accordance with an embodiment of the invention. An emitter aperture 302 and a detector aperture 304 are shown on the aperture piece 104.

The emitter aperture 302 may be configured to be positioned in the vicinity above the emitter 402 when the aperture piece 104 is registered to the lead frame 102. Similarly, the detector aperture 304 may be configured to be positioned above the detector 404 when the aperture piece 104 is registered to the lead frame 102.

The emitter aperture 302 may be further configured to assist in controlling the size of the speckle features by restricting a diameter of the beam of coherent light from the emitter 402. In a preferred embodiment, the emitter aperture 302 may be configured such that the emitted light is telecentric (i.e. normal to the scattering surface over which the optical positioning device is being laterally moved).

Figure 4A:
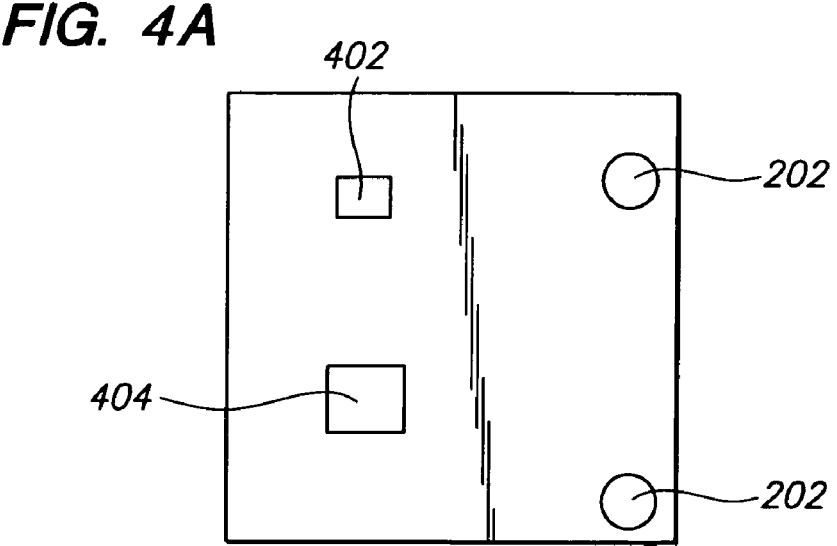
FIG. 4A is a planar diagram of a top side of a lead frame package including light source and detector components in accordance with an embodiment of the invention.

FIG. 4A is a planar diagram of a top side of a lead frame package including light source 402 and detector 404 components in accordance with an embodiment of the invention. In one embodiment, the light source 402 may comprise a vertical cavity surface emitting laser (VCSEL) die. The detector 404 may comprise a photodiode array (PDA) die.

The light source 402 may be placed with a positional tolerance of better (less) than +/−50 microns relative to the lead frame reference features 202. Hence, with a lens 106 to lead frame 102 positional tolerance of better (less) than +/−25 microns, the positional tolerance between the light source 402 and the surfaces of the molded lens 106 becomes better (less) than +/−75 microns.

Similarly, the detector 404 may be placed with a positional tolerance of better (less) than +/−50 microns relative to the lead frame reference features 202. Hence, with a lens 106 to lead frame 102 positional tolerance of better (less) than +/−25 microns, the positional tolerance between the detector 404 and the surfaces of the molded lens 106 becomes better (less) than +/−75 microns.

Figure 4B:
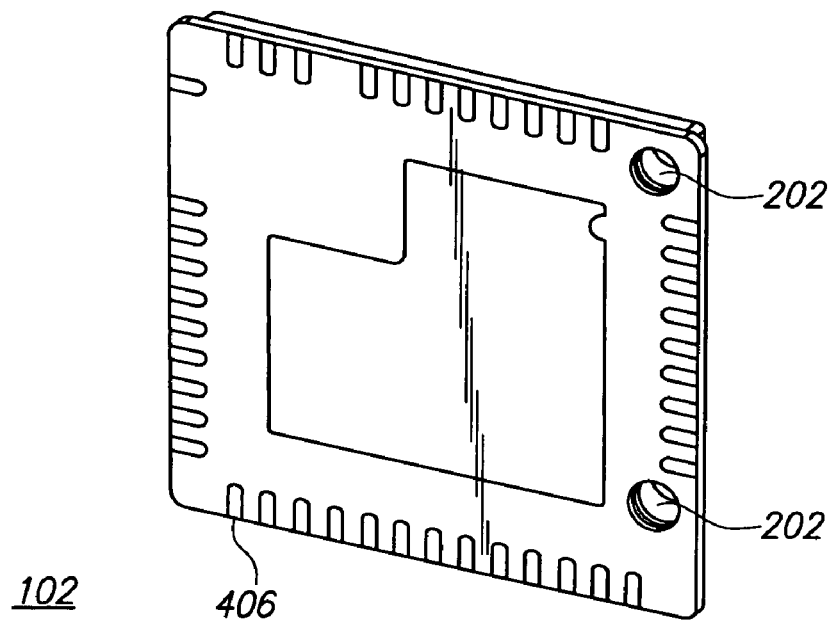
FIG. 4B is a perspective diagram of a bottom side of the lead frame package in accordance with an embodiment of the invention.

FIG. 4B is a perspective diagram of a bottom side of the lead frame package 102 in accordance with an embodiment of the invention. The conductive leads 406 of the package 102 are shown. These leads 406 are utilized for electrically connecting the lead frame 102 to other circuitry of the optical navigation system.

Figure 5:
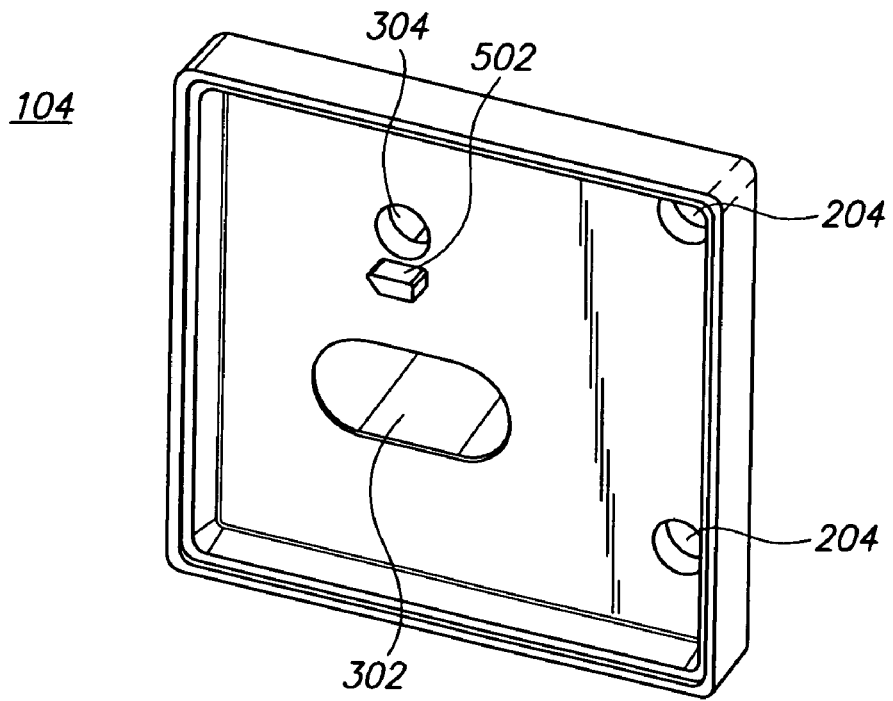
FIG. 5 is a perspective diagram of the aperture part in accordance with an embodiment of the invention.

FIG. 5 is a perspective diagram of the aperture part 104 in accordance with an embodiment of the invention. Shown in the diagram are the openings for the emitter aperture 302 and the detector aperture 304. A baffle portion 502 may be configured to prevent stray light coming from the light emitter 402 from reaching the detector 404 when the aperture part 104 is registered to the lead frame 102. The baffle part 502 may also be used to register (position) the aperture part 104 relative to the detector 404 on the lead frame 102.

Figure 6:
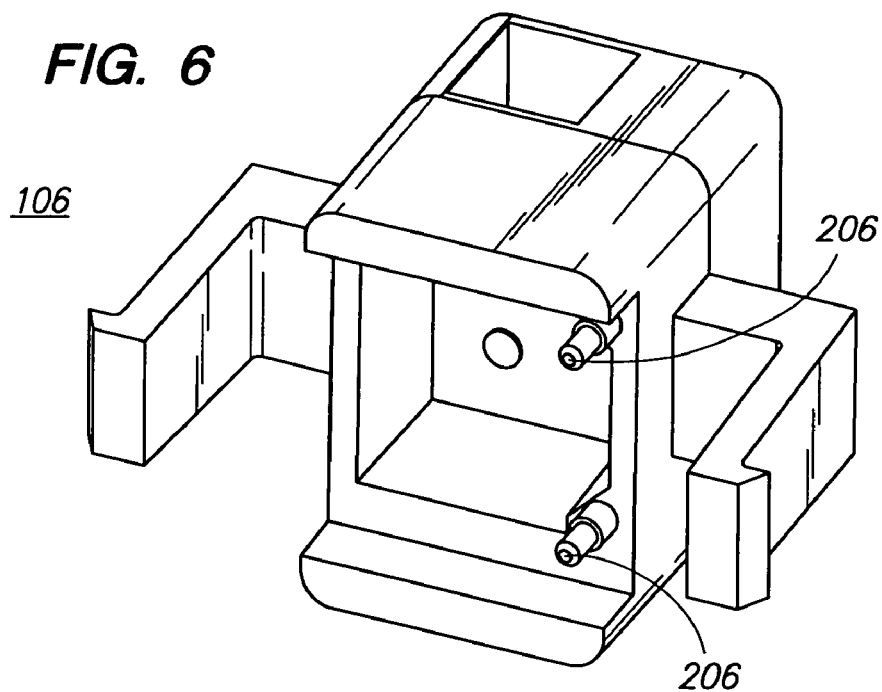
FIG. 6 is a perspective diagram of the molded lens in accordance with an embodiment of the invention.

FIG. 6 is a perspective diagram of the molded lens 106 in accordance with an embodiment of the invention. As mentioned above, the molded lens 106 may comprise a clear (transparent) transfer molded package. In an alternative embodiment, the molded lens 106 may comprise an open cavity package. As depicted, the molded lens 106 may include various surfaces and alignment features 206. The alignment features 206 may be configured for precise registration between the molded lens 106, the aperture part 104, and the lead frame 102.

Figure 7:
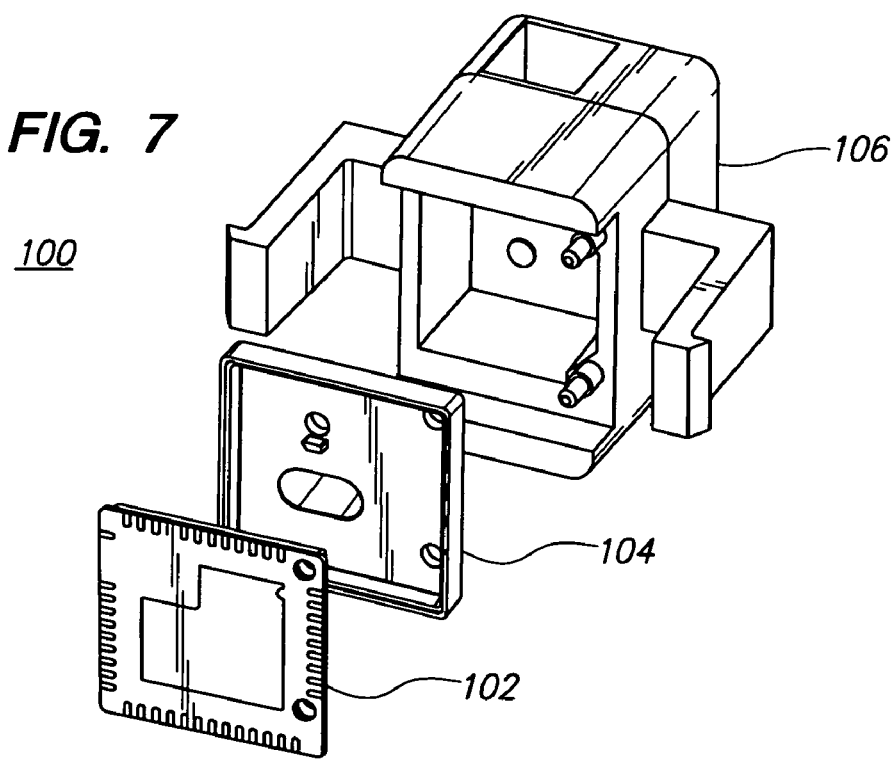
FIG. 7 is a different perspective diagram of the optical sensor package including the lead frame package, aperture part, and molded lens in accordance with an embodiment of the invention.

FIG. 7 is a different perspective diagram of the optical sensor package 100 including the lead frame package 102, aperture part 104, and molded lens 106 in accordance with an embodiment of the invention.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. An optical navigation device comprising:
a lead frame having reference features;
a laser attached to the lead frame and positioned in reference to the reference features;
a detector array attached to the lead frame and positioned in reference to the reference features;
an optical component coupled to the lead frame and having alignment features registered to the reference features of the lead frame such that the optical component is passively aligned to the laser and the detector array; and an optical aperture art between the lead frame and the optical component and having an emitter aperture configured to restrict a diameter of a beam of coherent light from the laser, the optical aperture part having reference features registered to the alignment features of the optical component and the reference features of the lead frame.

2. The optical navigation device of claim 1, wherein the optical component includes collimation optics for collimating light emitted by the laser.

3. The optical navigation device of claim 2, wherein the optical component further includes collection optics for collecting light onto the detector array.

4. The optical navigation device of claim 3, wherein the optical aperture part is between the collection optics and the detector array.

5. The optical navigation device of claim 4, wherein the optical aperture part is registered to a molding compound that covers at least a portion of the lead frame.

6. The optical navigation device of claim 5, wherein the optical component comprises said molding compound.

7. The optical navigation device of claim 1, wherein the optical aperture part includes a baffle that blocks a light path within the device between the laser and the detector array.

8. The optical navigation device of claim 1, wherein the reference features comprise holes in a substrate of the lead frame, and the alignment features comprise posts fitting into said holes.

9. The optical navigation device of claim 8, wherein the holes are formed by etching of the substrate of the lead frame.

10. An optical sensor comprising:
a lead frame having reference features;
an optical detector which is positioned in reference to the reference features on the lead frame;
an optical component for collecting light onto the detector, wherein the optical component is passively aligned to the detector by mechanical registration of alignment features of the optical component with the reference features of the lead frame; and
an optical aperture art between the lead frame and the optical component and having an emitter aperture configured to restrict a diameter of a beam of coherent light, the optical aperture part having reference features registered to the alignment features of the optical component and the reference features of the lead frame.

11. The optical sensor of claim 10, wherein the optical aperture part is aligned to the detector by registration of the reference features of the optical aperture part with the alignment features of the optical component.

12. The optical sensor of claim 10, wherein the reference features comprise holes, and the alignment features comprise posts fitting into said holes.

13. The optical sensor of claim 12, wherein the holes are formed by etching.

14. An apparatus to passively align an external lens to one or more packaged die, the apparatus comprising:
a lead frame;
a reference feature on the lead frame; the external lens;
an alignment feature of the external lens, where the alignment feature mechanically engages and passively registers to the reference feature of the lead frame; and
a die mounted to the lead frame at a position precisely referenced to the reference feature of the lead frame.

15. The apparatus of claim 14, wherein the reference features comprise holes, and the alignment features comprise posts fitting into said holes.

16. The apparatus of claim 15, wherein the holes are formed by etching.

17. A method of passively aligning an external lens to a light source and a detector array, the method comprising:
providing a lead frame;
etching reference features in the lead frame;
attaching the light source to the lead frame at a position in reference to the reference features of the lead frame;
attaching the detector array to the lead frame at a position in reference to the reference features of the lead frame;
providing a molded optical component including the external lens and having alignment features; and
mechanically coupling the molded optical component to the lead frame such that the alignment features of the molded optical component mechanically engage and register with the reference features of the lead frame.

18. The method of claim 17, further comprising: providing an aperture part having reference features; and coupling the aperture part to the lead frame in such a way that the alignment features of the molded optical component mechanically and register with the reference features of the aperture part.

* * * * *